United States Patent [19]

Mohr

[11] Patent Number: 5,242,581
[45] Date of Patent: Sep. 7, 1993

[54] SHUT-OFF VALVE

[75] Inventor: Kirby S. Mohr, Jenks, Okla.

[73] Assignee: Facet Quantek, Inc., Tulsa, Okla.

[21] Appl. No.: 860,087

[22] Filed: Mar. 30, 1992

[51] Int. Cl.⁵ .......................................... B01D 27/10
[52] U.S. Cl. ................................ 210/136; 210/234;
    210/431; 55/420; 137/528; 137/537; 251/82
[58] Field of Search .............. 210/111, 136, 119, 121,
    210/232, 234, 236, 418, 429, 431; 55/420;
    123/188 R, 90.1, 188 A, 188 B, 188 S, 188 SC;
    29/213.1, 122, 890; 137/68.1, 247.21, 247.23,
    329.3, 505, 528, 535, 537, 540, 543.17; 251/74,
    82, 142, 143, 175, 176, 185, 228, 281, 282, 318,
    324, 325, 333, 339, 359

[56] References Cited

U.S. PATENT DOCUMENTS

| 2,518,387 | 8/1950 | Shaw | 137/537 |
| 2,832,641 | 4/1958 | Korda | 137/537 |
| 3,036,593 | 5/1962 | Sauille | 251/82 |
| 4,806,217 | 2/1989 | Rosenberg | 210/108 |
| 4,967,791 | 11/1990 | Sternberger | 251/82 |

FOREIGN PATENT DOCUMENTS 2099111 8/1983 United Kingdom .

Primary Examiner—Robert A. Dawson
Assistant Examiner—W. L. Millard
Attorney, Agent, or Firm—Head & Johnson

[57] ABSTRACT

A shut-off valve for use in a filtration system with a filter element having a tubular coupling member at one end arranged so that when the filter is installed in the system the coupling element extends into a tubular housing to displace a spool to thereby permit flow through the filter element, the spool being returned by a compression spring to a closed position within the housing to shut off flow when the filter element is removed, the tubular housing having a pair of spaced apart internal sealing faces and the spool having a matching pair of spaced apart sealing surfaces that close against each other when the spool is in the closed position to thereby prevent flow through the valve. The valve is arranged in such a way that when in the closed position fluid pressure applied to the valve exerts force on the spool to urge it more tightly into the closed position.

10 Claims, 2 Drawing Sheets

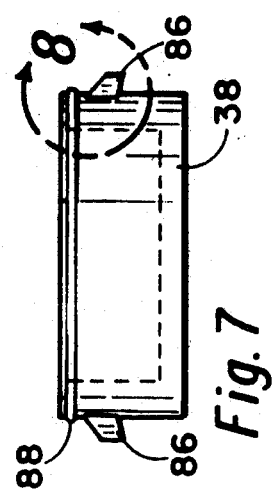
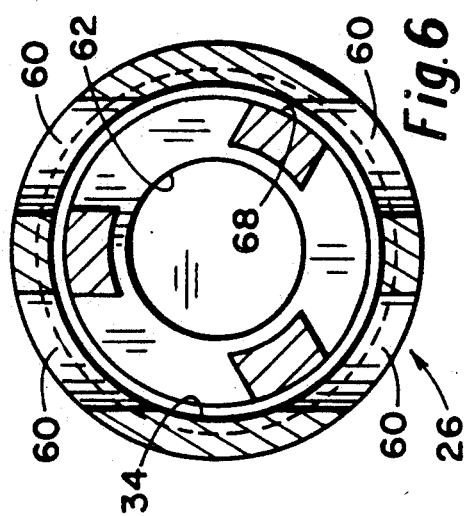
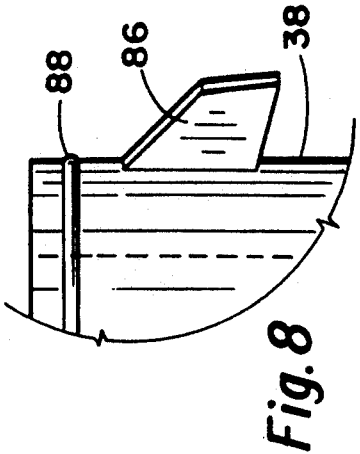
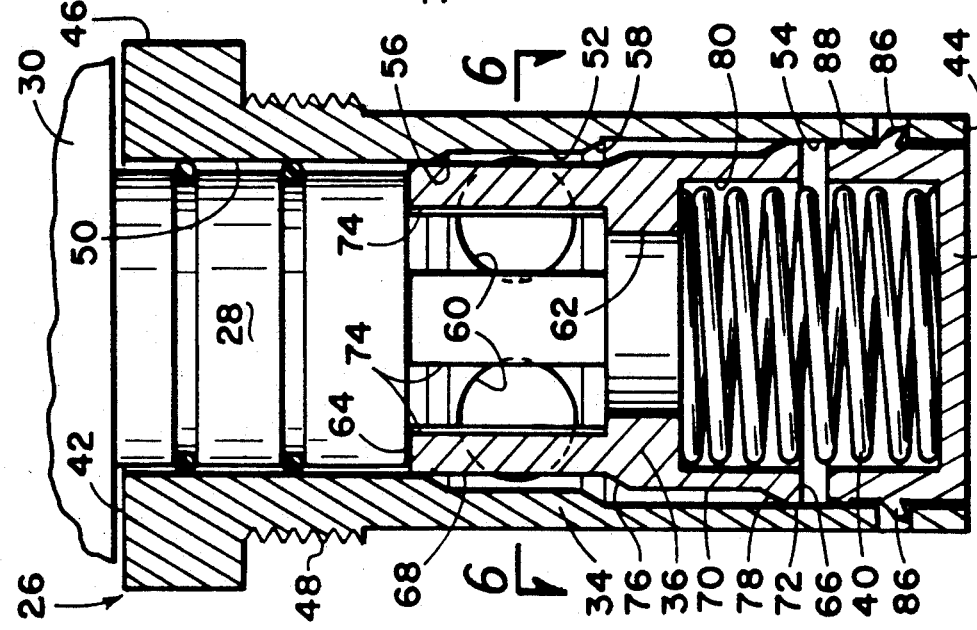
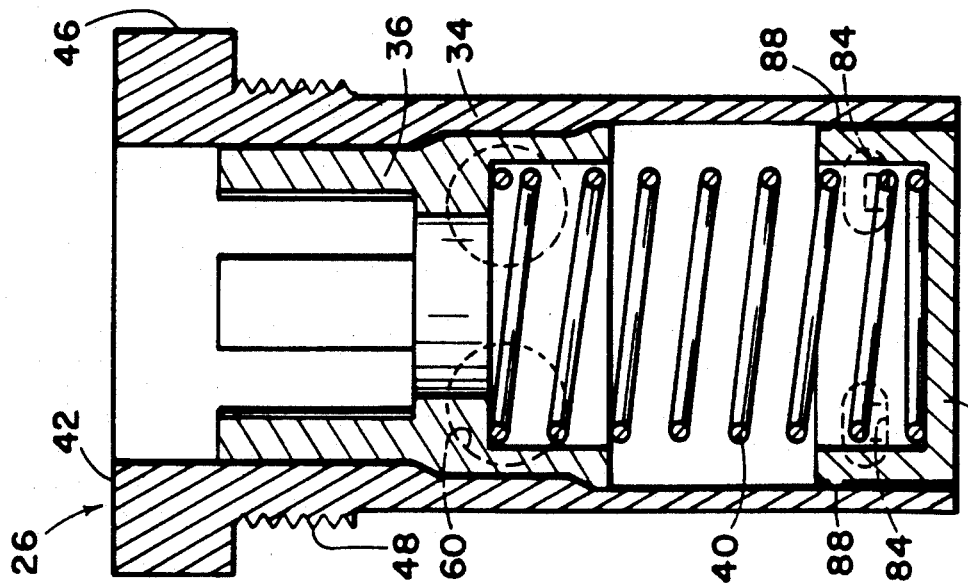

SHUT-OFF VALVE

BACKGROUND OF THE INVENTION

This invention relates to a shut-off valve that is used as a part of a filtration system of the type that has replacement filter cartridges with an integral tubular coupling member. When the filter cartridges are removed for replacement it is important that means be provided to prevent flow through the system if the filter cartridges are not replaced. That is, the shut-off valve of this disclosure is intended to provide a fail-safe arrangement for use in a filtration system employing removable filter cartridges so that in the event a workman removes a filter cartridge and fails to replace it, the system cannot be operated to pass fluid flow through it.

As an example of a filtration system that employs a fail-safe valve in a filtration vessel to prevent the flow of fluid through the filtration vessel in the event a filter element is removed and not replaced, reference may be had to co-pending U.S. Ser. No. 07/640,139 filed Jan. 11, 1991, which is now Pat. No. 5,122,264, entitled "Liquid Fuel Dispensing System With Improved Means Of Preventing Contamination". This previously filed application illustrates, at FIG. 8 therein, a type of adapter for telescopically and sealably receiving the tubular coupling member of a filter element. The adapter has a tubular valve element that is slidably positioned within an annular housing arranged such that until the valve element is physically displaced when a filter element coupling member is inserted into the adapter, fuel cannot flow therethrough. The present disclosure is for a device intended to accomplish the same result but having several improved features. An important difference in the device of the present disclosure compared to the fail-safe device of co-pending application Ser. No. 07/640,139, now U.S. Pat. No. 5,122,264, is that the device of the present disclosure is constructed in such a way that increased fluid pressure forces the valve more tightly towards the closed position.

For further background information relative to the present disclosure reference may be had to U.K. Patent GB 2 099 11 B entitled "Improvements In Or Relating To Shut-off Valves". This U.K. patent shows a type of shut-off valve to which the present disclosure is directed and is a further illustration of the environment in which the present disclosure is employed. The shut-off valve of the present disclosure, however, has improvements beyond those disclosed in the above-mentioned British patent. As an example, in the present disclosure the need for an elastomeric O-ring is eliminated. In addition, the present disclosure provides an arrangement having parallel seating surfaces within a tubular housing and in like manner on the exterior surface of a spool, so that the valve, in the closed position, provides dual sealing surfaces on opposite sides of outlet ports in the tubular housing.

Other important advantages of the shut-off valve of the present disclosure compared to that of the British patent are its simplicity and economy of construction and ease of assembly.

SUMMARY OF THE INVENTION

This invention is a shut-off valve for use in a filtration system. Particularly, the shut-off valve of this disclosure is for use in a filtration system employing a filter element having, as an integral part thereof, a tubular coupling member by which the filter element is inserted into and removed from the system. The shut-off valve provides a receptacle for the filter tubular coupling element to couple the filter element into the flow stream of the filtration system. The purpose of the shut-off valve of this disclosure is to positively close the system against fluid flow therethrough in the event a filter element is removed from the filtration system and not replaced.

The shut-off valve is formed of four basic elements, that is, a tubular housing, a tubular spool member slidably positioned within the housing, a compression spring and a closure member.

The tubular housing has first, second and third portions, each of increased internal diameter, extending from the first end to the second end of the housing. The transition between housing portions provides first and second sealing faces within the housing.

The tubular spool member, in like manner, has three portions defined by increasing external diameter, with the transition between diameters providing circumferential sealing surfaces. When the spool sealing surfaces mate with and seal against the housing sealing faces flow through the valve is terminated.

A cup-shaped closure member is inserted into the bottom end of the tubular housing to close the housing bottom end. In the preferred arrangement as illustrated herein, the housing has spaced apart retainer openings adjacent the bottom end and the closure member has integrally formed protruding tapered portions that, when the closure member is forced into position within the housing, snap into the retainer openings so that the closure member is held in position without requiring screws or other attachment devices. In addition, the closure member has an integrally formed circumferential bead formed on the external cylindrical surface which seals against the tubular housing internal wall to thereby eliminate the need of an O-ring or other type of sealing element.

A better understanding of the invention will be obtained from the description of the preferred embodiment as follows, taken in conjunction with the attached drawings.

DESCRIPTION OF THE DRAWINGS

FIG. 1 is to illustrate the environment in which the shut-off valve of the present invention is employed.

FIG. 4 is an elevational cross-sectional view taken along the line 4—4 of FIG. 3 showing the shut-off valve of this invention in the closed position, which occurs when the tubular coupling portion of the filter element is not positioned within the valve.

FIG. 5 is an elevational cross-sectional view as in FIG. 4 but showing the tubular coupling portion of the filter element positioned within the valve and showing the valve in the open position.

FIG. 6 is a cross-sectional view of the valve in the open position as taken along the line 6—6 of FIG. 5.

FIG. 7 is an elevational view of the closure member as employed in the shut-off valve.

FIG. 8 is an enlarged fragmentary portion of the closure member as taken at 8 of FIG. 7.

DESCRIPTION OF THE PREFERRED EMBODIMENT

Figure 1:
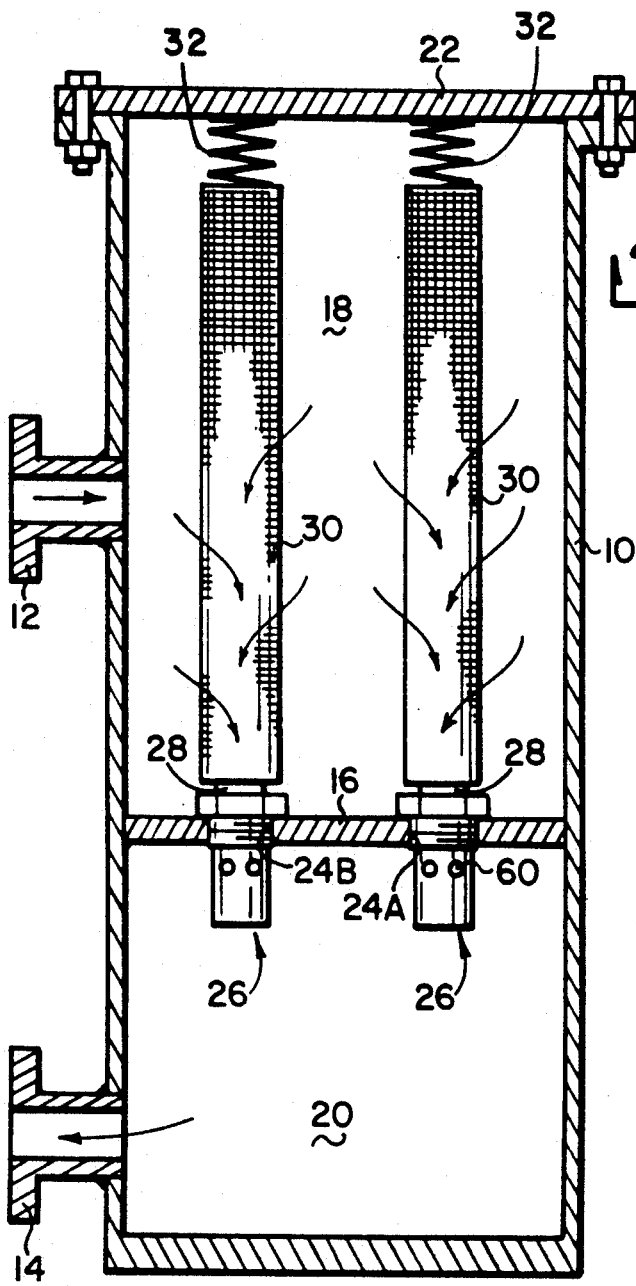
FIG. 1 is an elevational cross-sectional view of a filtration system employing two filter elements and two shut-off valves that are the subject of this invention.
Figure 3:
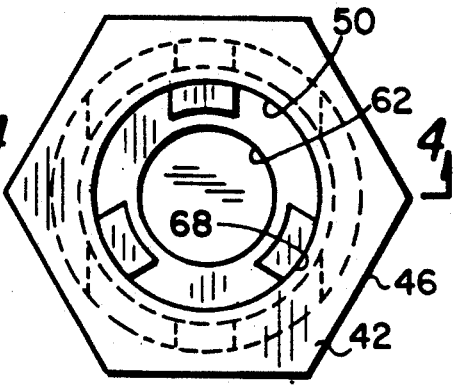
FIG. 3 is a top plan view of the shut-off valve of FIG. 2.
Figure 2:
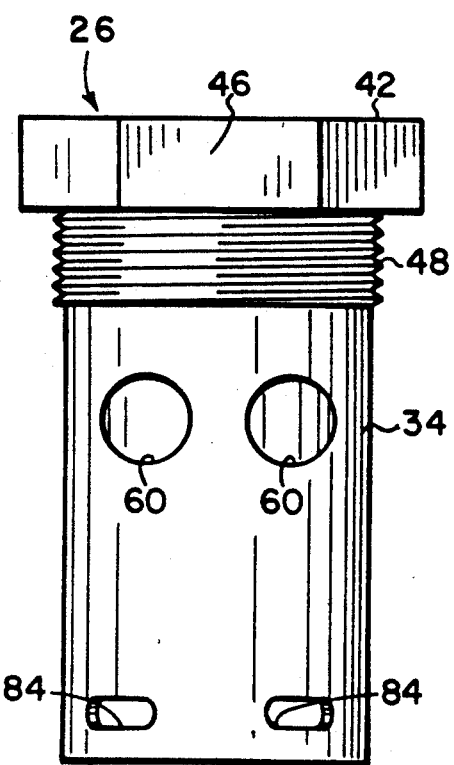
FIG. 2 is an enlarged external view of a shut-off valve that embodies the principles of this invention.

FIG. 1 shows a filtration system including a vessel 10 having a fluid inlet 12 and a fluid outlet 14. Separating the fluid inlet and outlet is an internal plate 16 dividing the interior of the vessel into an incoming portion 18 and an outgoing portion 20. The upper open top of the vessel is closed by a cover 22. Plate 16 has threaded openings 24A and 24B therein, each of which receives a shut-off valve generally indicated by the numeral 26.

Each shut-off valve 26 serves two purposes. First, each valve serves to receive the tubular connecting portion 28 of filter elements 30 by which the filter elements are supported within the vessel. The second function of each of the shut-off valves is to close flow therethrough in the event the filter element, with its tubular connecting portion 28, is removed from the vessel. The manner in which these two important functions is achieved will be described in detail subsequently with reference to FIGS. 2 through 8. Each of filter elements 30 is held in position by spring 32 to provide fluid coupling with shut-off valve 26 when cover 22 is closed.

To replace a filter element 30, cover 22 is removed. Either one or both of filter elements 30 may be then extracted from the vessel by merely upward pull on the filter element to dislodge tubular connecting portion 28 from the shut-off valve. One problem that has existed in the past is that in some instances a workman will remove one or more of the filter elements in a filtration system without replacing it. For instance, if a filter element 30 is removed and cover 22 installed without the benefit of shut-off valve 26 the system could operate with fluid flowing through inlet 12, past plate 16 and out through the outlet 14 thereby completely avoiding filtration. Serious consequences can result when fuel is delivered without proper filtration. It is an object of this invention to provide an improved shut-off valve 26 that will positively close against fuel flow if a filter element 30 is removed.

Turning now to FIGS. 2 through 8, the improved shut-off valve of this invention will be described. As shown in the cross-sectional views of FIGS. 4 and 5, the shut-off valve 26 includes four basic components, that is: a tubular housing 34; a tubular spool 36 slideably positioned within the housing; a closure member 38 that closes the bottom end of the housing; and a compression spring 40.

Housing 34 has an upper end 42 and a lower end 44. At upper end 42 the housing has an external hex configuration 46 providing wrench surfaces and below the wrench surfaces external threads 48. Threads 48 are threadably received in the internal threaded openings 24A and 24B of plate 16 in the filter system of FIG. 1.

The internal arrangement of housing 34 is best seen in FIGS. 4 and 5. The housing includes a first portion 50 of selected internal diameter. The tubular connecting portion 28 of a filter 30 is telescopically received in the housing first portion 50, as illustrated in FIG. 5.

The housing second portion 52 has an internal diameter greater than housing first portion 50. Housing third portion 54, which is at housing lower end 44, is of an external diameter greater than housing second portion 52.

The transition intermediate first housing portion 50 and second housing portion 52 provides a first sealing face 56. The transition between housing second portion 52 and housing third portion 54 provides a second sealing face 58.

Formed in the housing second portion 52 are a plurality (four being illustrated) of boreholes 60.

Slidably positioned within the housing is a spool 36. Spool 36 is tubular, that is, it has an internal passageway 62 therethrough and has a top end 64 and a bottom end 66. Spool 36 has a first portion 68 of an external diameter slightly less than the internal diameter of housing first portion 50. The spool has a second portion 70 that is of a diameter slightly greater than the external diameter of first portion 68 and slightly less than the internal diameter of housing second portion 52. The spool has a third portion 72 that is of external diameter greater than second portion 70 and slightly less than the internal diameter of housing third portion 54.

Spool first portion 68 is provided with spaced apart slots 74 therein. In the illustrated arrangement, spool first portion 68 has wide slots so that the spool integral portions between the slots are narrower than the slots, however, this is merely representative as passageways could be provided in the spool first portion 68 such as by openings therethrough rather than slots. In the illustrated arrangement there are three wide slots 74 equally spaced, leaving the spool first portion 68 therebetween. It is preferable that the number of slots 74 be different than the number of boreholes 60 so that the portion of the spool between the slots can never align with all of boreholes 60, ensuring that there is always a passageway between the interior of the spool and the boreholes 60 when the spool is in the open position as shown in FIG. 5.

The transition between spool first portion 68 and second portion 70 provides a first circumferential spool sealing surface 76. In like manner, the transition between spool second portion 70 and third portion 72 provides a spool second circumferential sealing surface 78. The sealing surfaces 76 and 78 are preferably of truncated conical configuration and sealably match the housing sealing faces 56 and 58 when the spool is in the closed position, as in FIG. 4. In the closed position of FIG. 4 fluid flow is sealed above and below boreholes 60 so that fluid flow from the interior of the shut-off valve cannot occur through the boreholes.

Spool 36 has an enlarged internal diameter cup-shaped recess 80 communicating with the spool lower end 66.

Received within the lower end of housing 34 is a cup-shaped closure member 38. The external diameter of the closure member is slightly less than the internal diameter of housing third portion 54. Formed in the housing third portion are retainer openings 84 that are spaced apart from each other. In the typical arrangement there are, as illustrated, four retainer openings 84, only two of which are seen in FIG. 4.

The external configuration of closure member 38 is shown in FIG. 7. It has an external cylindrical surface and spaced apart integral externally protruding tapered locking bosses 86. There are the same number of locking bosses 86 as retainer openings 84 and they are spaced alike so as to be in register with each other when the closure member 38 is inserted in position within the bottom open end of housing 34. The integral locking bosses are designed such that the taper permits the closure member to be forced into position within the housing so that the locking bosses snap in position within retainer openings 84 to thereafter securely hold the closure member within the interior of the housing.

Integrally formed on the external circumferential surface of the closure member adjacent the top end is an integral seal ring 88. The integral seal ring and locking bosses 86 are best seen in the highly enlarged view of FIG. 8. The integral seal ring forms sealing contact between the closure member and the internal surface of the housing third portion 54 to sealably close the lower end of the housing.

The improved shut-off valve functions as follows. When a filter element 30 is in position within the valve, filter element tubular connecting portion 28 is telescopically received within valve housing first portion 50. This arrangement provides physical support for the filter element as shown in FIG. 1 and provides closed communication between the interior of the filter element and the interior of valve 26. When in position within the shut-off valve, filter tubular connecting portion 28 physically depresses downwardly spool 36, compressing coiled spring 40 that is received within the valve between the cup-shaped closure member 38 and the cup-shaped recess 80 formed in the bottom end of spool 36. In such downwardly depressed position, as shown in FIG. 5, free flow communication is provided between the interior of the filter tubular connecting portion 28 and boreholes 60 so that fluid freely flows from the filter system incoming portion 18 (see FIG. 1) through a filter 30, through tubular connecting portion 28, out boreholes 60 into the vessel outgoing portion 20 and out of the vessel through fluid outlet 14.

When a filter element 30 is removed, that is more particularly, when a filter tubular connecting portion 28 is removed from within the shut-off valve, the condition as shown in FIG. 4 occurs, that is, without a physical element downwardly displacing spool 36, spring 40 returns the spool to the upright and closed position. In such upright position the spool seals against the interior of housing 34, both above and below the boreholes 60. That is, spool first sealing surface 76 sealably engages housing first sealing face 56 and, in like manner, the spool second sealing surface 78 sealably engages housing second sealing face 58. Fluid flow through the shut-off valve is thus closed. Further, as increased fluid pressure is applied to the valve, such pressure is transmitted into the interior of housing 30 and since the cross-sectional areas of the lower portion of spool 36 are greater than that of the upper portions, there is a tendency for such fluid pressure to move the spool toward the upward, closed position, thus aiding the effort of compression spring 40 and to more securely seal the spool to the interior of the housing.

The shut-off valve of this disclosure can be inexpensively manufactured in that it requires only four elements, and the elements can be very expeditiously assembled without the use of fasteners. Further, the shut-off valve provides effective sealing without the need of O-rings or other type of gasket or secondary sealing elements.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A shut-off valve comprising, a generally tubular housing having a first and a second end, wherein the housing includes a first open-ended housing portion adjacent said first end and having a first internal diameter, a second housing portion having a second internal diameter greater than said first internal diameter, apertures being provided in said second housing portion to allow communication between the interior of said second housing portion and the exterior thereof, and a third housing portion of internal diameter greater than said second housing portion, there being a first frustoconical internal sealing face between said first and second housing portions and a second frustoconical internal sealing face between said second and third housing portions;

a hollow spool slidable within said housing wherein said spool includes a first spool portion that is freely slidable within said first housing portion, a second spool portion of diameter greater than said first spool portion slidable within said second housing portion, and a third spool portion of diameter greater than said second spool portion slidable within said third housing portion, there being a first frustoconical spool sealing surface between said first and second spool portions and a second frustoconical spool sealing surface between said second and third spool portions, said spool being moveable between a valve open position and a valve closed position and in which in said valve closed position said spool first sealing surface contacts said housing first sealing face and said spool second sealing surface simultaneously contacts said housing second sealing face closing flow through said housing apertures, said spool first portion having apertures therein whereby in said valve open position fluid freely flows through said housing apertures, said housing being closed at said second end, and resilient means normally urging said spool towards said valve closed position and wherein the arrangement is such that, if liquid is introduced under pressure through the open end of said housing, the resulting forces acting on said spool tends to move said spool sealing surfaces into increased engagement with said housing sealing faces.

2. A shut-off valve according to claim 1 including means on the exterior of said housing of sealably mounting said housing in a filtration system.

3. A shut-off valve according to claim 1 wherein the apertures provided in said second portion of said housing to allow communication between the interior and the exterior thereof comprises a plurality of spaced apart radial holes through the wall of said housing second portion.

4. A shut-off valve according to claim 1 wherein said apertures in said spool first portion are formed by a plurality of spaced apart elongated slots.

5. A shut-off valve according to claim 3 wherein said apertures in said spool first portion are formed by a plurality of spaced apart elongated slots and wherein the number of said slots is different than the number of said radial holes through said wall of said housing second portion.

6. A shut-off valve according to claim 1 wherein said means to normally urge said spool towards said closed position is a compression spring.

7. A shut-off valve according to claim 1 wherein said housing is closed at said second end by a closure member sealably positioned with said housing third portion.

8. A shut-off valve according to claim 7 wherein said closure member is cup-shaped and wherein said spool has a cup-shaped recess therein and wherein said means to normally urge said spool towards said closed position is a compression spring received at one end within said cup-shaped closure member and at the other end within said spool cup-shaped recess.

9. A shut-off valve according to claim 7 wherein said housing has a plurality of spaced apart retainer openings in said third portion and wherein said closure member has a cylindrical external surface slideably receivable within said housing third portion, said closure member having integral outwardly protruding tapered locking bosses that are in register with and are received within said retainer openings providing means of retaining said closure member within said housing third portion.

10. A shut-off valve according to claim 7 wherein said closure member is cylindrical and of external diameter substantially equal to the internal diameter of said housing third portion and wherein said closure member has an integral outwardly radially extending circumferential seal of slightly increased external diameter that forms a circumferential seal between said closure member and said housing when said closure member is pressed into said housing third portion.

* * * * *